H. F. YOUNGS.
COASTER BRAKE.
APPLICATION FILED JUNE 24, 1915.

1,227,868.

Patented May 29, 1917.

Inventor
H. F. YOUNGS
By Watson E. Coleman
Attorney

UNITED STATES PATENT OFFICE.

HARRY F. YOUNGS, OF SANTA CRUZ, CALIFORNIA.

COASTER-BRAKE.

1,227,868.  Specification of Letters Patent.  Patented May 29, 1917.

Application filed June 24, 1915. Serial No. 36,027.

*To all whom it may concern:*

Be it known that I, HARRY F. YOUNGS, a citizen of the United States, residing at Santa Cruz, in the county of Santa Cruz and State of California, have invented certain new and useful Improvements in Coaster-Brakes, of which the following is a specification, reference being had to the accompanying drawings.

This invention relates to certain improvements in coaster brakes and has relation more particularly to a device of this general character especially designed and adapted for use in connection with bicycles; and it is an object of the invention to provide a device of this general character of a novel and improved construction which may be readily and effectively applied to the hub of the rear or driving wheel of a bicycle.

It is also an object of the invention to provide a device of this general character having novel and improved means whereby the same may be operated to permit coasting and which may also be operated to afford a brake.

The invention consists in the details of construction and in the combination and arrangement of the several parts of my improved brake whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

As disclosed in the accompanying drawings, B denotes an annular section or member internally threaded, as at $m$, to afford means whereby the same may be readily engaged with the hub of the rear or driving wheel of a bicycle or the like. Snugly surrounding the section or member B and capable of rotation therearound with a minimum of friction is the annular member or section A having teeth radiating therefrom so that said member A may be engaged with a drive chain as generally employed in connection with bicycles, although I do not wish to be understood as limiting myself in this particular respect.

Figure 1:
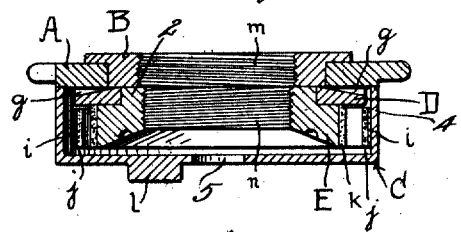
Figure 1 is a sectional view taken through a coaster brake constructed in accordance with an embodiment of my invention.
Figure 2:
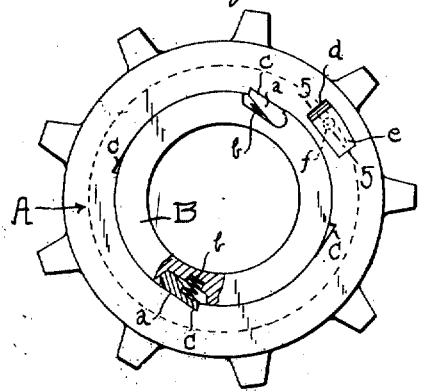
Fig. 2 is a view partly in elevation and partly in section of the inner section of my improved coaster brake.
Figure 4:
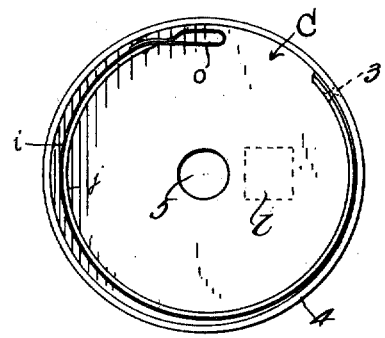
Fig. 4 is an inside elevational view of the cap herein employed together with the brake band coacting therewith.

E denotes an annular section or member provided with the internal threads $n$ whereby the same may also be readily engaged with the hub of a driving wheel, and as is particularly illustrated in Fig. 1 of the accompanying drawings, it is to be noted that the threads $m$ and $n$ are reversely directed, the threads $m$ being right hand and the threads $n$ left hand. It is also thought to be proper that the sections or members B and E be identified, when in assembled relation, as a hub member. It will therefore be at once understood that the member or section E serves as a lock member for maintaining the section or member B in applied position upon the hub.

Figure 3:
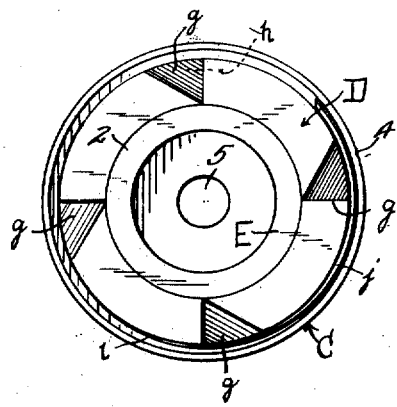
Fig. 3 is an inside elevational view of the outer section of my improved coaster brake.
Figures 5, 6:
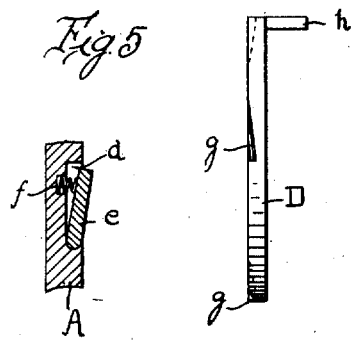
Fig. 5 is an enlarged sectional view taken substantially on the line 5—5 of Fig. 2.
Fig. 6 is a view in side elevation of the ratchet member herein embodied and which coacts with the brake band.

The inner portion of the section or member E is angularly reduced to afford a neck 2, and rotatably engaged upon said neck 2 is the annular member D provided in its inner face with the notches or recesses $g$ which extend across the surface of the member D and gradually slope upwardly in one direction through the inner surface of said member as is believed to be particularly illustrated in Figs. 3 and 6.

The outer face of the annular member or section A has produced therein a substantially rectangular recess $d$ in which is pivotally mounted the dog or pawl $e$. An end portion of said dog or pawl $e$ is constantly urged outwardly toward the member D through the medium of the spring $f$ so that when the member or section A is rotated rearwardly as by a back pedaling action it will be perceived that the pawl or dog $e$ will be engaged with one of the notches or recesses $g$ to cause the member D to move in unison therewith. It will also be self-evident that as the member or section A moves forwardly the same will rotate independently of the member D.

Extending laterally from a peripheral portion of the member D and overlying the outer peripheral portion of the member E, is the pin or tooth $h$ which is adapted to be directed through the loop O arranged at the free end portion of the brake band $i$, the opposite end portion of said brake band being suitably anchored or attached, as at 3, to the side wall or flange 4 of the cap member C when the same is in applied position.

The cap member C, when in applied position, houses the members D and E and said cap member C is provided with the outstanding lug or knob $l$ angular in cross section and positioned at one side of the axial center of the cap and which is adapted to extend within the slot or kerf of an ordinary type of bycycle frame whereby said cap member C is maintained against axial rotation. The cap member C is also provided with the opening 5 arranged at its axial center and through which the axle of the driving wheel is adapted to extend.

It is thought to be self-evident that upon rotating the member or section A rearwardly, the resultant movement imparted to the member D will cause the band $i$ to frictionally engage the adjacent periphery of the member E to effect a braking action. It is preferred that the inner face of the band $i$ be provided with a fiber lining $j$ and the coacting periphery of the member E be provided with a similar lining or covering $k$ in order to facilitate or enhance the frictional coaction between said band $i$ and the member E.

The inner edge of the member or section A is provided with the ratchet notches $c$ preferably four in number and equidistantly spaced and which are adapted to receive the free extremities of the dogs or pawls $a$ carried by the member B, said dogs or pawls $a$ being preferably two in number and diametrically opposed.

The free extremities of the dogs or pawls $a$ are constantly urged outwardly through the medium of the springs $b$, and it is to be noted that the pawls or dogs $a$ and the coacting notches $c$ are so related as to cause the members or sections A and B to rotate in unison in a forward direction and to permit the member or section A to rotate independently of the member B upon back pedaling or rearward rotation being given to said section or member A. It will also be at once self-evident that upon the member or section A being held against rotation, the coaction between the pawls or dogs $a$ and the notches $c$ are such as to permit the member or section B to rotate in a forward direction.

From the foregoing description, it is thought to be obvious that a brake constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In a coaster brake, a hub member, an annular member rotatably supported by said hub member, said last named member being provided with driving means, coacting means carried by the hub member and the annular member for causing the same to rotate in unison in one direction, a second annular member rotatably supported by the hub member and provided in its inner face with beveled recesses, a pawl carried by the outer face of the first named annular member and coacting with the recesses of the second annular member for causing both of said annular members to rotate in unison in one direction but opposite to the direction of unitary movement of the hub member and the first named annular member, a cap inclosing the outer portion of the hub member and the second named annular member, and a brake band secured to the cap and disposed around the hub member and engaged with the second named annular member whereby the unitary movement of both of said annular members causes the brake band to frictionally engage the hub member.

2. In a coaster brake, a hub member, an annular member rotatably supported by said hub member, said last named member being provided with driving means, coacting means carried by the hub member and the annular member for causing the same to rotate in unison in one direction, a second annular member rotatably supported by the hub member and provided in its inner face with beveled recesses, a pawl carried by the outer face of the first named annular member and coacting with the recesses of the second annular member for causing both of said annular members to rotate in unison in one direction but opposite to the direction of unitary movement of the hub member and the first named annular member, a cap inclosing the outer portion of the hub member and the second named annular member, a brake band secured to the cap and disposed around the hub member and engaged with the second named annular member whereby the unitary movement of both of said annular members causes the brake band to frictionally engage the hub member, and an outstanding lug carried by the cap member at one side of its axial center to afford means to hold said cap against axial rotation.

HARRY F. YOUNGS.

Witnesses:
C. G. DAKE,
LUCAS F. SMITH, Jr.

Copies of this patent may be obtained for five cents each, by addressing the "Commissioner of Patents, Washington, D. C."